United States Patent
Tanimoto

(10) Patent No.: US 9,509,623 B2
(45) Date of Patent: Nov. 29, 2016

(54) INFORMATION PROCESSING DEVICE, INFORMATION PROCESSING SYSTEM, AND METHOD FOR PROCESSING PACKETS FROM TRANSMITTING DEVICES

(71) Applicant: FUJITSU LIMITED, Kawasaki-shi, Kanagawa (JP)

(72) Inventor: Teruo Tanimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/258,194

(22) Filed: Apr. 22, 2014

(65) Prior Publication Data

US 2014/0362867 A1    Dec. 11, 2014

(30) Foreign Application Priority Data

Jun. 5, 2013  (JP) ................................ 2013-118439

(51) Int. Cl.
| | |
|---|---|
| *H04L 12/823* | (2013.01) |
| *H04L 12/863* | (2013.01) |
| *H04L 12/825* | (2013.01) |
| *H04L 12/835* | (2013.01) |

(52) U.S. Cl.
CPC ............. *H04L 47/32* (2013.01); *H04L 47/266* (2013.01); *H04L 47/30* (2013.01)

(58) Field of Classification Search
CPC ............................ H04L 47/32; H04L 47/625
USPC ....................................................... 370/412
See application file for complete search history.

(56) References Cited

U.S. PATENT DOCUMENTS

| | | | | |
|---|---|---|---|---|
| 5,172,246 A | * | 12/1992 | Yoshida | H04N 1/32619 358/405 |
| 5,255,268 A | * | 10/1993 | Cato | H04L 12/4604 370/405 |
| 6,067,408 A | * | 5/2000 | Runaldue | G06F 13/385 710/307 |
| 6,598,174 B1 | * | 7/2003 | Parks | G06F 11/008 711/162 |
| 6,973,071 B1 | * | 12/2005 | Bourk | H04L 47/10 370/349 |
| 7,154,619 B1 | | 12/2006 | Yoshida et al. | |
| 7,171,464 B1 | * | 1/2007 | Raghuraman | H04L 67/125 709/224 |
| 7,324,535 B1 | * | 1/2008 | Goss | H04L 45/50 370/230 |
| 2008/0183884 A1 | * | 7/2008 | Chen | H04L 29/06 709/230 |
| 2010/0074211 A1 | * | 3/2010 | Kim | H04L 1/1671 370/329 |
| 2010/0254262 A1 | * | 10/2010 | Kantawala | H04L 12/56 370/232 |
| 2010/0296449 A1 | * | 11/2010 | Ishii | H04L 1/1874 370/328 |

FOREIGN PATENT DOCUMENTS

| | | |
|---|---|---|
| JP | 11-112722 | 4/1999 |
| JP | 2001-168907 | 6/2001 |

\* cited by examiner

*Primary Examiner* — Rasheed Gidado
(74) *Attorney, Agent, or Firm* — Oblon, McClelland, Maier & Neustadt, L.L.P.

(57) ABSTRACT

An information processing device configured to process packets received from a plurality of sources includes a buffer configured to store the packets received from the plurality of sources, a first processing unit configured to transmit, to a source of a first packet, a request to stop transmission of the first packet and configured to discard the first packet if the buffer does not have an available region for storing the first packet received, and a second processing unit configured to transmit, to the source of the first packet, a request to retransmit the first packet if the buffer has the available region.

8 Claims, 21 Drawing Sheets

FIG. 4

| TYPE VALUE | TYPE OF PACKET |
|---|---|
| 000 | NORMAL PACKET |
| 001 | ACK |
| 010 | NAK |
| 011 | STOP REQUEST (NAK-RNR) |
| 100 | RETRANSMIT REQUEST |

FIG. 19

| TIME | t0 | t1 | t2 | t3 | t4 | t5 | t6 | t7 | t8 | t9 | t10 | t11 | t12 | t13 | t14 | t15 | TOTAL |
|---|---|---|---|---|---|---|---|---|---|---|---|---|---|---|---|---|---|
| NUMBER OF PACKETS TRANSMITTED FROM TRANSMISSION PROCESS GROUP | 32 k | | 28 k | | 24 k | | 20 k | | 16 k | | 12 k | | 8 k | | 4 k | | 144 k |
| NUMBER OF ACKs TRANSMITTED FROM RECEPTION PROCESS | | 4 k | | 4 k | | 4 k | | 4 k | | 4 k | | 4 k | | 4 k | | 4 k | 32 k |
| NUMBER OF NAKs TRANSMITTED FROM RECEPTION PROCESS | | 28 k | | 24 k | | 20 k | | 16 k | | 12 k | | 8 k | | 4 k | | | 112 k |

FIG. 20

| TIME | t0 | t1 | t2 | t3 | t4 | t5 | t6 | t7 | t8 | t9 | t10 | t11 | t12 | t13 | t14 | t15 | TOTAL |
|---|---|---|---|---|---|---|---|---|---|---|---|---|---|---|---|---|---|
| NUMBER OF PACKETS TRANSMITTED FROM TRANSMISSION PROCESS GROUP | 32 k | | 4 k | | 4 k | | 4 k | | 4 k | | 4 k | | 4 k | | 4 k | | 60 k |
| NUMBER OF ACKs TRANSMITTED FROM RECEPTION PROCESS | | 4 k | | 4 k | | 4 k | | 4 k | | 4 k | | 4 k | | 4 k | | 4 k | 32 k |
| NUMBER OF STOP REQUESTS TRANSMITTED FROM RECEPTION PROCESS | | 28 k | | | | | | | | | | | | | | | 28 k |
| NUMBER OF RETRANSMIT REQUESTS TRANSMITTED FROM RECEPTION PROCESS | | 4 k | | 4 k | | 4 k | | 4 k | | 4 k | | 4 k | | 4 k | | | 28 k |

INFORMATION PROCESSING DEVICE, INFORMATION PROCESSING SYSTEM, AND METHOD FOR PROCESSING PACKETS FROM TRANSMITTING DEVICES

CROSS-REFERENCE TO RELATED APPLICATION

This application is based upon and claims the benefit of priority of the prior Japanese Patent Application No. 2013-118439, filed on Jun. 5, 2013, the entire contents of which are incorporated herein by reference.

FIELD

The embodiment discussed herein is related to an information processing device, an information processing system, and a method for controlling an information processing system.

BACKGROUND

For example, a buffer (hereinafter referred to as shared receive buffer) that is, for example, a shared receive queue (SRQ) for Infiniband and stores packets received from a plurality of nodes, processes, or the like is known.

FIG. 1 is an example of a system that uses the shared receive buffer. In the example illustrated in FIG. 1, a receiving node has a shared receive buffer 1000. The receiving node temporarily stores packets received from transmitting nodes #1 and #2 in the shared receive buffer 1000. Then, the receiving node sequentially processes the packets stored in the shared receive buffer 1000.

For example, in a system that includes a single transmitting node and a single receiving mode, a source of packets may estimate, based on the number of the packets transmitted by the source and the sizes of the transmitted packets, whether or not a buffer has an available region. However, since packets transmitted by the plurality of sources are stored in the shared receive buffer in the system illustrated in FIG. 1, the sources of the packets do not recognize whether or not the shared receive buffer has an available region. Thus, the sources may transmit packets regardless of the fact that the shared receive buffer does not have an available region, overflow may occur from the shared receive buffer, and a transmitted packet may be discharged.

Thus, for the case where overflow occurs from the shared receive buffer, each of the source nodes or processes is requested to have a function of retransmitting a packet in the system that uses the shared receive buffer.

For retransmission of a packet in a system that includes a transmitting device and a receiving device, there is the following technique. Specifically, the receiving device transmits, to the transmitting device, an order number described in the packet and a reception expectation order number that is an order number provided for the case where it is assumed the data packet is transmitted without a loss. The transmitting device specifies a lost packet based on information received from the receiving device and retransmits the lost packet.

The aforementioned technique assumes a loss that occurs when a packet is discarded due to a bit error on a transmission path or congestion. The technique, however, does not assume that a measure is taken for a packet discarded due to the occurrence of overflow from a buffer. If overflow occurs from the buffer, and the discarded packet is immediately retransmitted, the overflow from the buffer may not be solved and the packet may be discarded again. In addition, the receiving device used for the aforementioned technique does not have a buffer corresponding to the shared receive buffer.

Thus, the aforementioned conventional technique does not support retransmission to be executed when overflow occurs from the shared receive buffer.

Japanese Laid-open Patent Publication No. 2001-168907 is an example of related art.

According to an aspect, an object of the embodiment is to provide a technique for efficiently retransmitting a packet when overflow occurs from a shared receive buffer.

SUMMARY

According to an aspect of the invention, an information processing device configured to process packets received from a plurality of sources, the information processing device includes a buffer configured to store the packets received from the plurality of sources; a first processing unit configured to transmit, to a source of a first packet, a request to stop transmission of the first packet and configured to discard the first packet if the buffer does not have an available region for storing the first packet received; and a second processing unit configured to transmit, to the source of the first packet, a request to retransmit the first packet if the buffer has the available region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating associations of values of a type field with types of packets;

FIG. 19 is a diagram describing the process according to the embodiment in detail;

FIG. 20 is a diagram describing the process according to the embodiment in detail.

DESCRIPTION OF EMBODIMENT

Figure 1:
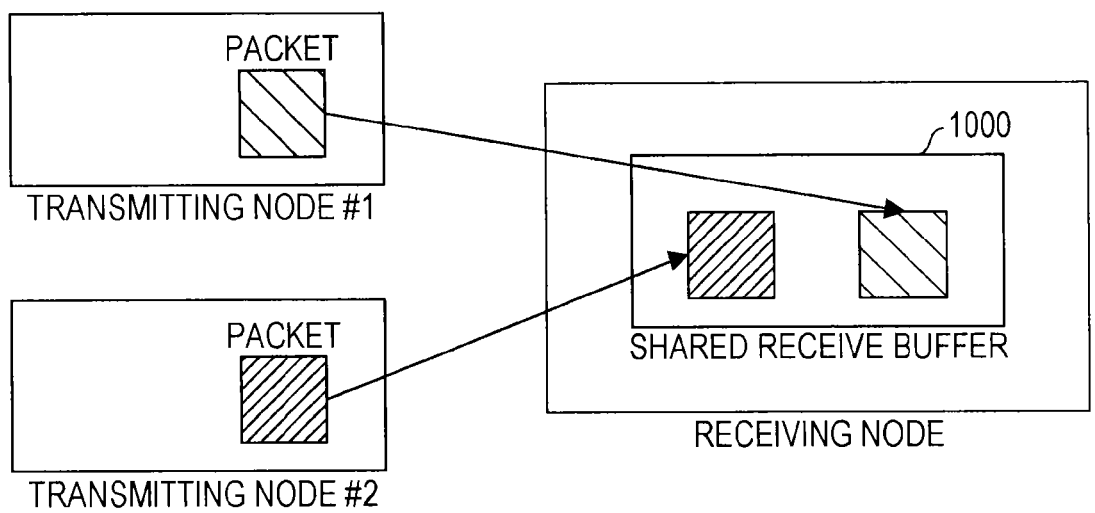
FIG. 1 is a diagram illustrating an example of a system that uses a shared receive buffer.
Figure 2:
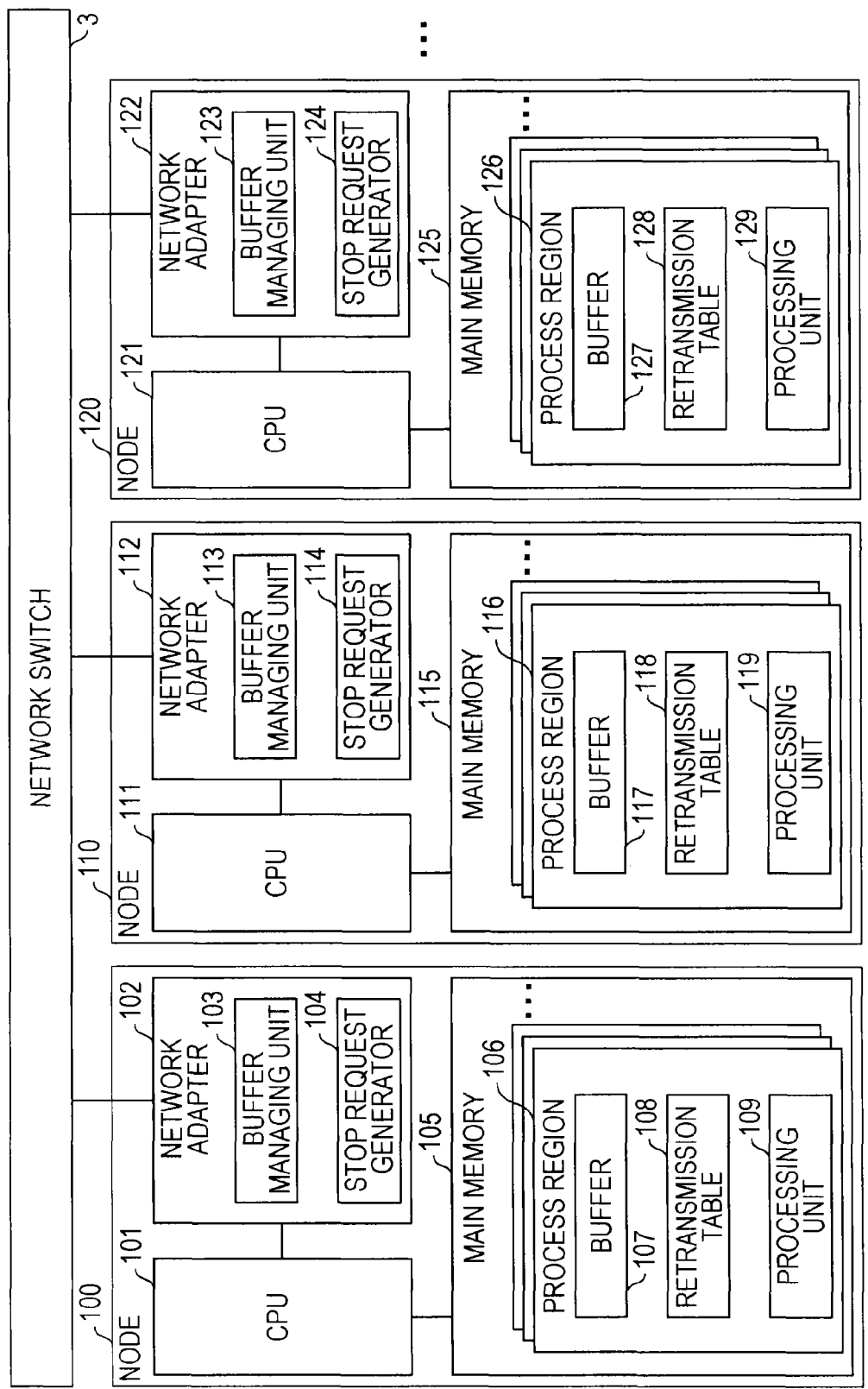
FIG. 2 is a diagram illustrating an outline of a system according to an embodiment.

FIG. 2 illustrates an outline of a system according to an embodiment. For example, a node 100, a node 110, and a node 120 are connected to a network switch 3 that is, for example, a Layer 2 switch. Although FIG. 2 illustrates the three nodes, the number of nodes is not limited.

The node 100 includes a central processing unit (CPU) 101, a network adapter 102, and a main memory 105. The network adapter 102 includes a buffer managing unit 103 and a stop request generator 104. The main memory 105 includes at least one process region 106. The network adapter 102 is connected to the network switch 3. The CPU 101 is connected to the network adapter 102 and the main memory 105. If the main memory 105 includes a plurality of process regions 106, the process regions 106 are prepared for processes, respectively. Thus, if the number of the processes is N (N is a natural number), the number of the process regions 106 is N.

The buffer managing unit 103 manages a buffer 107 and a retransmission table 108 that are included in the process region 106. The stop request generator 104 generates, in accordance with an instruction of the buffer managing unit 103, a stop request (Non-AcKnowledgement-Receiver Not Ready (NAK-RNR)) to inform that a packet is not received and to stop transmission of a packet. The process region 106 is a memory region to be used for a process of a program to be executed by the CPU 101. The buffer 107 is a shared receive buffer (for example, an SRQ). Data that is used to manage retransmission is stored in the retransmission table 108. A processing unit 109 processes a packet stored in the buffer 107, executes a process of generating a retransmit request, and the like.

Configurations of the nodes 110 and 120 are the same as the configuration of the node 100, and a description thereof is omitted. Each of the nodes 100 to 120 may be any of a packet transmitter and a packet receiver.

Figure 3:
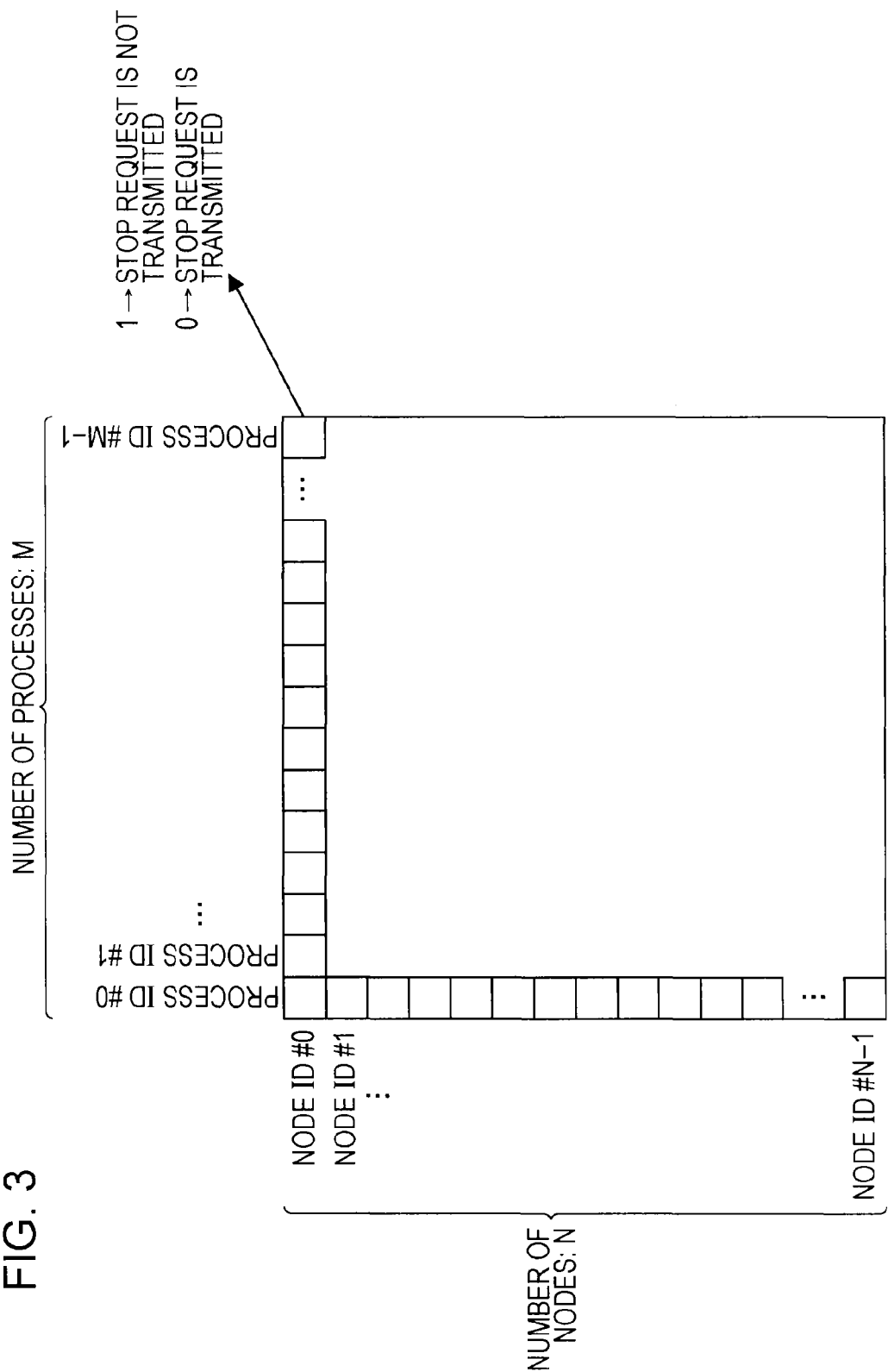
FIG. 3 is a diagram illustrating an example of a data structure of a retransmission table.

FIG. 3 illustrates an example of a data structure of the transmission table. In the example illustrated in FIG. 3, a flag that indicates whether or not a stop request has been transmitted is stored in the retransmission table for each of combinations of node IDs and process IDs. If the stop request is not transmitted (or a packet is not retransmitted), the flag is set to "1". If the stop request has been transmitted (or the packet is to be retransmitted), the flag is set to "0". For example, if the number of nodes is N (N is a natural number) and the maximum number of processes of the nodes is M (M is a natural number), a number N×M of regions for storing flags are prepared.

FIG. 4 illustrates associations of values of a type field included in a packet transmitted and received nodes with types of packets. In the embodiment, packets of five types are used. If a value that is indicated in the type field and provided for a packet is "000", the packet is a normal packet. If a value that is indicated in the type field and provided for a packet is "001", the packet is an ACK (ACKnowledgement). If a value that is indicated in the type field and provided for a packet is "010", the packet is an NAK (Non-AcKnowledgement, indicating the NAK other than an NAK-RNR in the embodiment). If a value that is indicated in the type field and provided for a packet is "011", the packet is a stop request (NAK-RNR). If a value that is indicated in the type field and provided for a packet is "100", the packet is a retransmit request.

Figure 5:
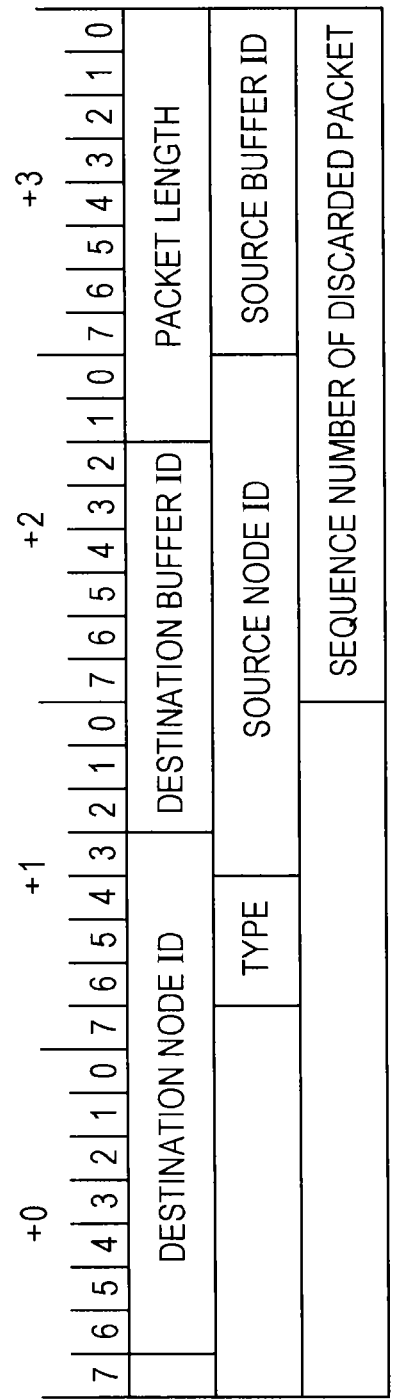
FIG. 5 is a diagram illustrating an example of a stop request.

FIG. 5 illustrates an example of the stop request. The stop request includes information (of 10 bits) indicating a packet length, a destination buffer ID (of 9 bits that may be a destination process ID), a destination node ID (of 12 bits), a source buffer ID (of 8 bits that may be a source process ID), a source node ID (of 12 bits), a type value (of 3 bits), and a sequence number (of 16 bits) of a discarded packet. Each of the stop request generators 104, 114, and 124 generates a stop request based on information included in a discarded packet.

Figure 6:
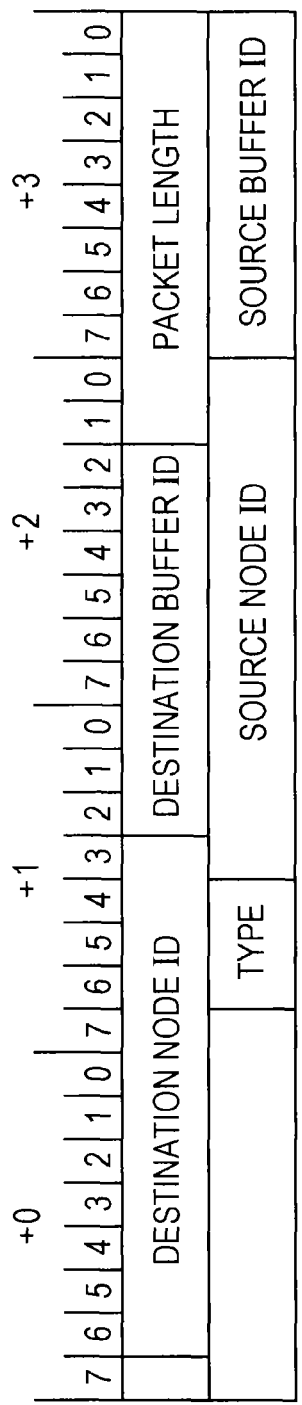
FIG. 6 is a diagram illustrating an example of a retransmit request.

FIG. 6 illustrates an example of the retransmit request. The retransmit request includes information (of 10 bits) indicating a packet length, a destination buffer ID (of 9 bits that may be a destination process ID), a destination node ID (of 12 bits), a source buffer ID (of 8 bits that may be a source process ID), a source node ID (of 12 bits), and a type value (of 3 bits). The processing units 109, 119 and 129 generate a retransmit request based on the retransmission tables 108, 118, and 128.

Figure 7:
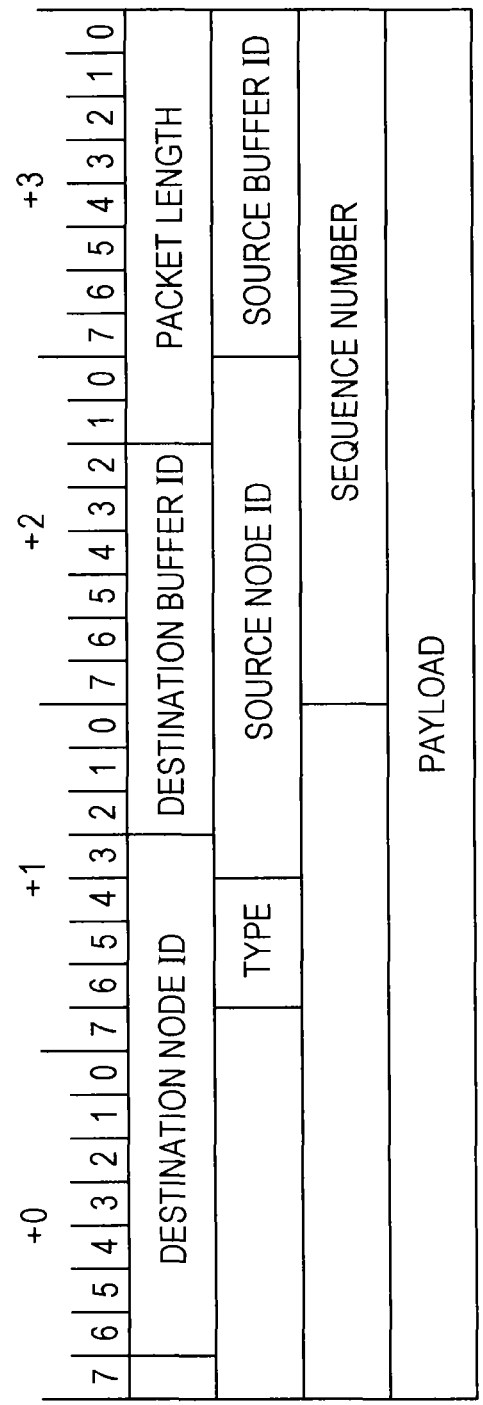
FIG. 7 is a diagram illustrating an example of a normal packet.

FIG. 7 illustrates an example of the normal packet. The normal packet includes information (of 10 bits) indicating a packet length, a destination buffer ID (of 9 bits that may be a destination process ID), a destination node ID (of 12 bits), a source buffer ID (of 8 bits that may be a source process ID), a source node ID (of 12 bits), a type value (of 3 bits), a sequence number (of 16 bits), and a payload (variable length).

Figure 8:
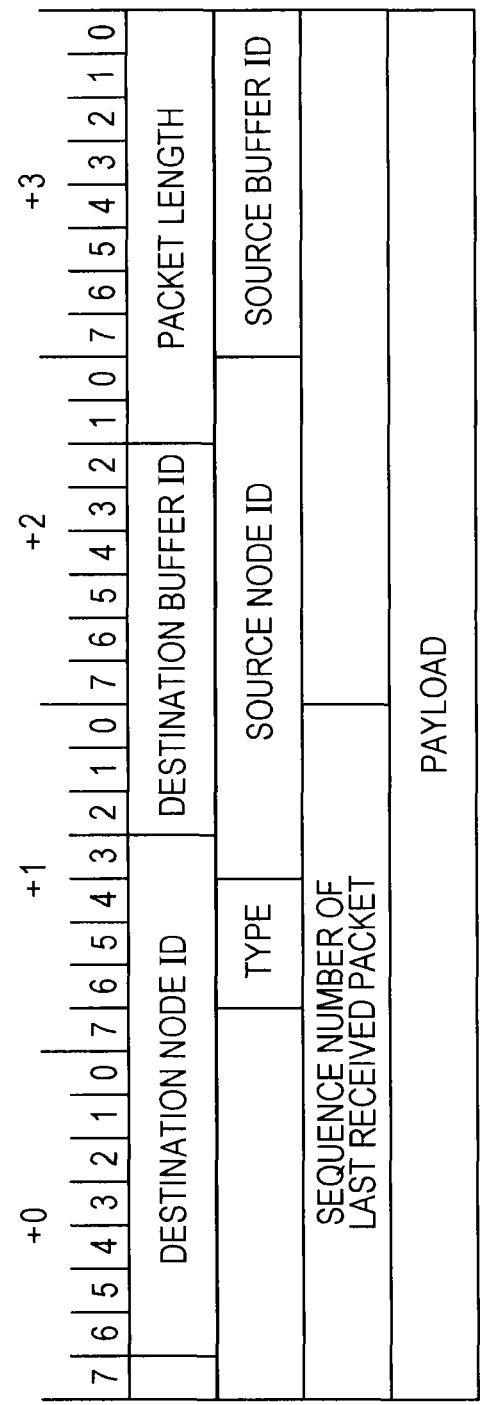
FIG. 8 is a diagram illustrating an example of each of an ACK and an NAK.

FIG. 8 illustrates an example of the ACK and the NAK. Each of the ACK and the NAK includes information (of 10 bits) indicating a packet length, a destination buffer ID (of 9 bits that may be a destination process ID), a destination node ID (of 12 bits), a source buffer ID (of 8 bits that may be a source process ID), a source node ID (of 12 bits), a type value (of 3 bits), a sequence number (of 16 bits) of a packet last received, and a payload (variable length).

Figure 9:
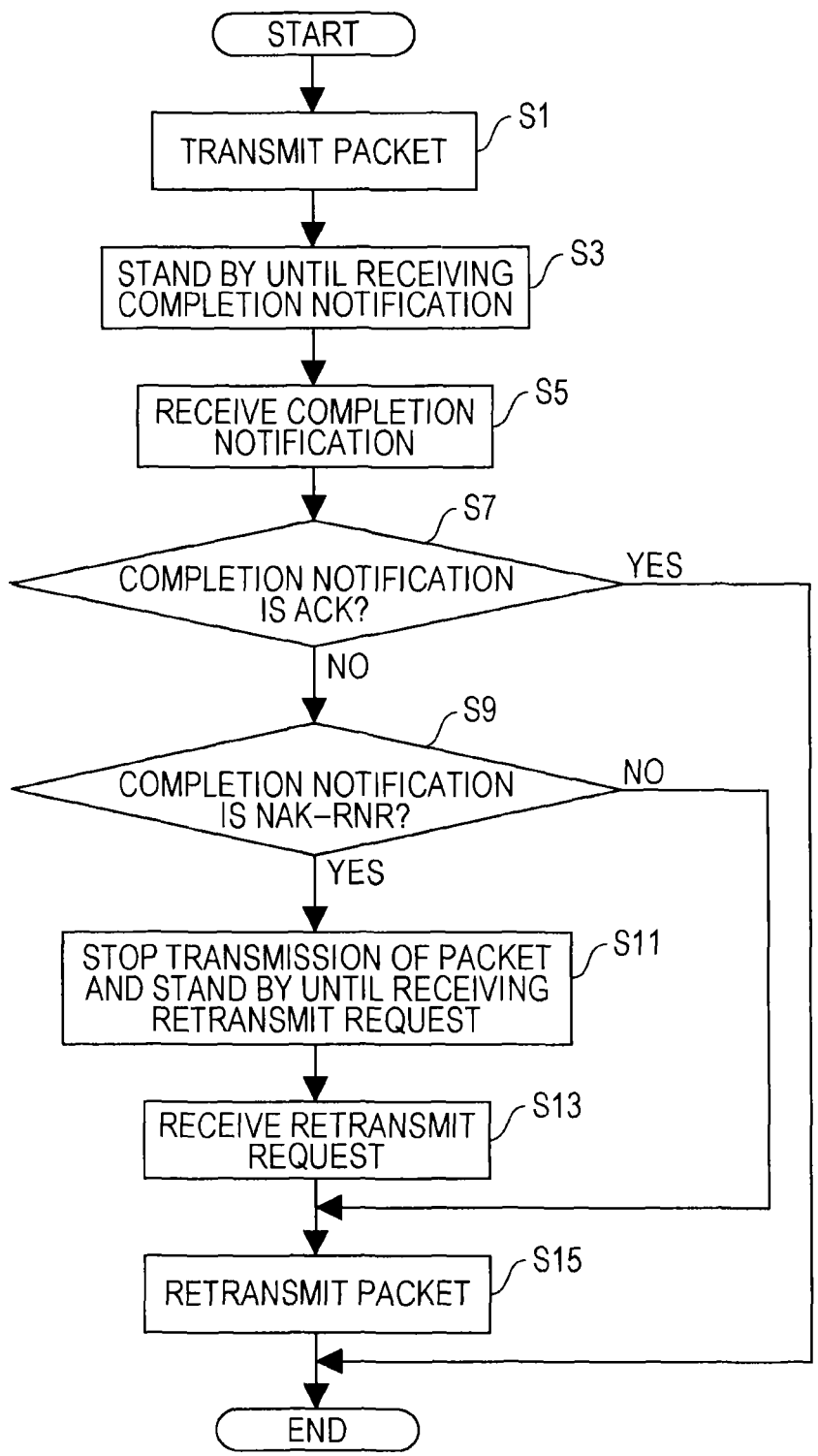
FIG. 9 is a flowchart of a process to be executed by a node that transmits a packet.

Next, a process that is executed by a node that transmits a packet is described with reference to FIG. 9. In order to simplify the following description, it is assumed that the node that transmits the packet is the node 100.

First, the processing unit 109 that is included in the process region 106 of the node 100 generates a packet and transmits the packet to a process (hereinafter referred to as reception process) of processing the packet (in operation S1 illustrated in FIG. 9). The generated packet is a packet illustrated in FIG. 7, for example.

The processing unit 109 stands by until receiving a completion notification from the reception process (in operation S3). Then, the processing unit 109 receives the completion notification from the reception process (in operation S5). The received completion notification is stored in the buffer 107 by the buffer managing unit 103. The completion notification according to the embodiment is any of an ACK, an NAK, or an NAK-RNR (or a stop request).

The processing unit 109 determines whether or not the completion notification is an ACK (in operation S7). If the completion notification is the ACK (Yes in operation S7), the packet is not retransmitted and the process is terminated.

If the completion notification is not the ACK (No in operation S7), the processing unit 109 determines whether or not the completion notification is an NAK-RNR (in operation S9).

If the completion notification is not the NAK-RNR (No in operation S9), the completion notification is an NAK other than the NAK-RNR and the process proceeds to operation S15. This is due to the fact that the processing unit 109 may immediately retransmit the NAK.

If the completion notification is the NAK-RNR (Yes in operation S9), the processing unit 109 stands by until receiving a retransmit request from the reception process. Then, the processing unit 109 receives the retransmit request from the reception process (in operation S13). The received NAK-RNR is stored in the buffer 107 by the buffer managing unit 103.

The processing unit 109 retransmits the packet transmitted in operation S1 to the reception process (in operation S15). Then, the process is terminated.

As described above, if the NAK-RNR (or the stop request) is received, the packet is not immediately retransmitted and is retransmitted after the reception of the retransmit request. Thus, the retransmitted packet is inhibited from being discarded again due to overflow from the shared receive buffer.

If the NAK other than the NAK-RNR is received, the packet is immediately retransmitted. This is due to the fact that the immediate retransmission of the packet does not cause a problem. In this case, the processing unit 109 retransmits the packet without waiting for the occurrence of a timeout. Thus, a time taken until the packet is retransmitted may be reduced.

Figure 10:
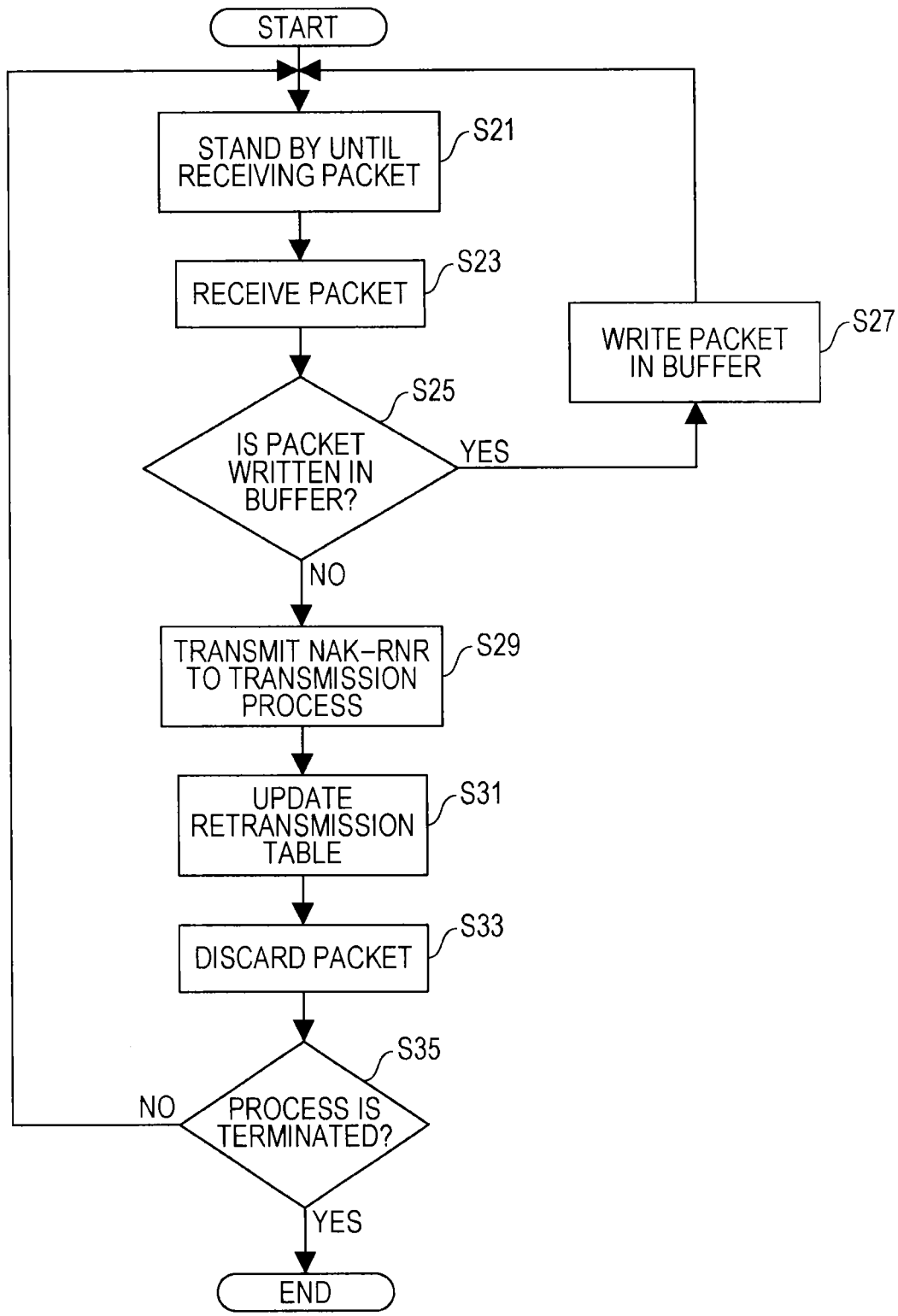
FIG. 10 is a flowchart of a process to be executed by a network adapter included in a node that receives a packet.

Next, a process that is executed by a network adapter of a node that receives a packet is described with reference to FIG. 10. In order to simplify the following description, it is assumed that the node that receives the packet is the node 110.

First, the buffer managing unit 113 that is included in the network adapter 112 of the node 110 stands by until receiving the packet from a process (hereinafter referred to as transmission process) of transmitting the packet (in operation S21 illustrated in FIG. 10).

The buffer managing unit 113 receives the packet from the transmission process (in operation S23). Then, the buffer managing unit 113 determines whether or not the received packet is written in a buffer 117 (or whether or not the buffer 117 has an available region) (in operation S25).

If the received packet is written in the buffer 117 (Yes in operation S25), the buffer managing unit 113 writes the received packet in the buffer 117 (in operation S27) and the process returns to operation S21.

On the other hand, if the received packet is not written in the buffer 117 (No in operation S25), the buffer managing unit 113 causes the stop request generator 114 to generate an NAK-RNR (or a stop request) that requests the transmission process to stop transmission of a packet. Then, the buffer managing unit 113 transmits the NAK-RNR generated by the stop request generator 114 to the transmission process that is a source of the received packet (in operation S29).

The buffer managing unit 113 updates the retransmission table 118 (in operation S31). Specifically, the buffer managing unit 113 sets, to "0", a flag for a combination of an ID of a node of the transmission process and an ID of the transmission process. Then, the buffer managing unit 113 discards the received packet (in operation S33).

The buffer managing unit 113 determines whether to terminate the process (in operation S35). If the process is to be terminated (Yes in operation S35), the process is terminated. For example, if an operator of the node 110 instructs the node 110 to turn off a power source of the node 110, the process is terminated.

On the other hand, if the process is not terminated (No in operation S35), the process returns to operation S21 in order to process a next packet.

When the stop request is transmitted in the aforementioned manner, the retransmission of the packet in a state in which the buffer does not have an available region may be suppressed, and thus the number of wastefully retransmitted packets may be reduced.

Next, a process that is executed by a reception process (processing unit 129 in the following case) of a node that receives a packet is described with reference to FIG. 11.

Figure 11:
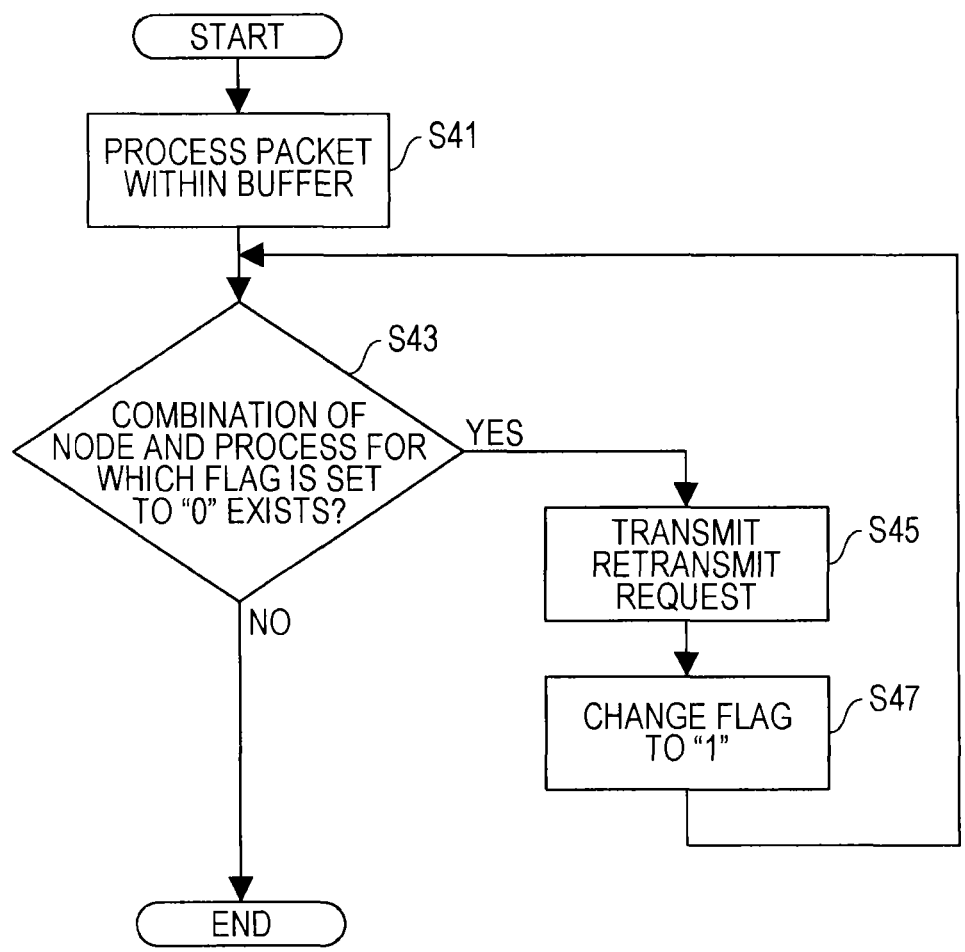
FIG. 11 is a flowchart of a process to be executed by a reception process of a node that receives a packet.

First, the processing unit 129 processes a packet stored in the buffer 127 (in operation S41 illustrated in FIG. 11). In operation S41, (1) all packets stored in the buffer 127 may be processed, or (2) a predetermined number of packets stored in the buffer 127 may be processed, or (3) packets may be processed until the number of packets stored in the buffer 127 reaches a predetermined number.

The processing unit 129 determines whether or not a combination of a node ID and a process ID for which a flag "0" is set exists in the retransmission table 128 (in operation S43). If the combination of the node ID and the process ID for which the flag "0" is set does not exist (No in operation S43), the packet is not retransmitted and the process is terminated.

On the other hand, if the combination of the node ID and the process ID for which the flag "0" is set exists (Yes in operation S43), the processing unit 129 transmits a request to retransmit the packet to a transmission process identified by the process ID (in operation S45).

The processing unit 129 changes the flag for the combination specified in operation S43 from "0" to "1" in the retransmission table 128 (in operation S47). Then, the process returns to operation S43.

In a certain method, the node that receives the packet transmits a stop request in multicast to a transmission process that may transmit a packet. However, since the multicast transmission may be costly (for example, when the multicast transmission is not executed by hardware, and unicast transmission is executed multiple times, equivalently with the multicast transmission), the certain method is not appropriate in some cases.

On the other hand, in the embodiment, a stop request and a retransmit request are transmitted only to a process that has actually transmitted a packet, and the number of wasteful requests is reduced, compared with the case where a stop request and a retransmit request are transmitted in multicast.

In addition, since a retransmit request is transmitted when an available region exists, retransmission is executed immediately, compared with the case where the retransmission is executed after a timeout occurs.

Figure 12:
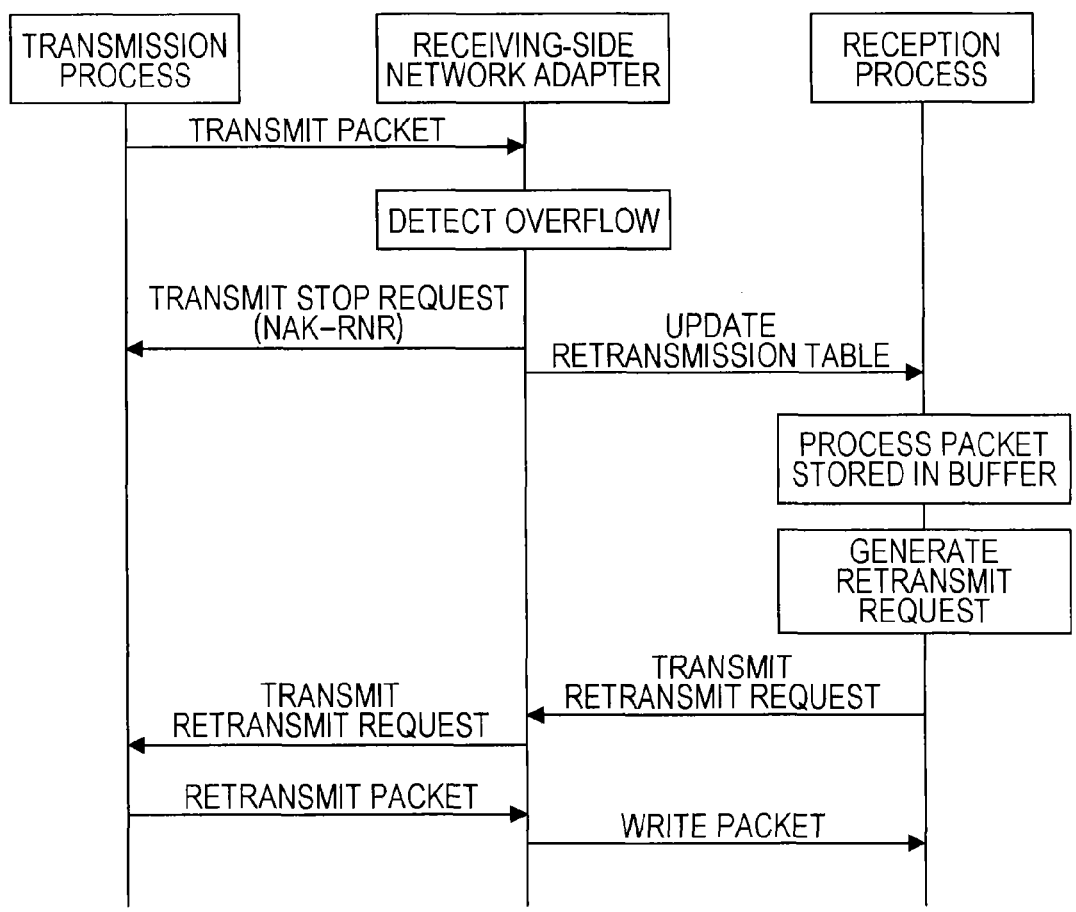
FIG. 12 is a diagram illustrating a sequence of a process according to the embodiment.

FIG. 12 illustrates a sequence of a process according to the embodiment. FIG. 12 illustrates a transmission process of transmitting a packet, a network adapter (hereinafter referred to as receiving-side network adapter) of a node that receives the packet, and a reception process of processing the received process.

First, the transmission process transmits the packet to the node that receives the packet. Thus, the receiving-side network adapter receives the packet from the transmission process. The receiving-side network adapter tries to cause the received packet to be stored in the buffer included in the process region for the reception process, but detects that if the received packet is stored in the buffer, overflow occurs from the buffer.

Thus, the receiving-side network adapter transmits a stop request to the transmission process and discards the received packet. In addition, the receiving-side network adapter updates the retransmission table included in the process region provided for the reception process in the main memory. Specifically, the receiving-side network adapter sets a flag for a combination of an ID of a node of the transmission process and an ID of the transmission process to "0".

The reception process processes packets stored in the buffer included in the process region for the reception process. For example, the reception process processes the packets by First In First Out (FIFO). If the buffer has an available region due to the process, the reception process generates a retransmit request and outputs the retransmit request to the receiving-side network adapter. The receiving-side network adapter transmits the received retransmit request to the transmission process.

The transmission process receives the retransmit request from the receiving-side network adapter. The transmission process retransmits, to the receiving-side network adapter, the packet (or the packet discarded by the receiving-side network adapter) transmitted immediately before receiving the stop request. The receiving-side network adapter writes the retransmitted packet in the buffer included in the process region for the reception process.

When the aforementioned process is executed, the packet is inhibited from being retransmitted in a state in which the shared receive buffer does not have an available region, and thus the number of wastefully retransmitted packets may be reduced. Specifically, if overflow occurs from the shared receive buffer, the packet is efficiently retransmitted.

Next, the process according to the embodiment is described in detail with reference to FIGS. 13 to 17. FIGS. 13 to 17 each describe a series of processes that are transmission of a packet, detection of overflow from a buffer, transmission of a stop request, transmission of a retransmit request, and retransmission of the packet.

Figure 13:
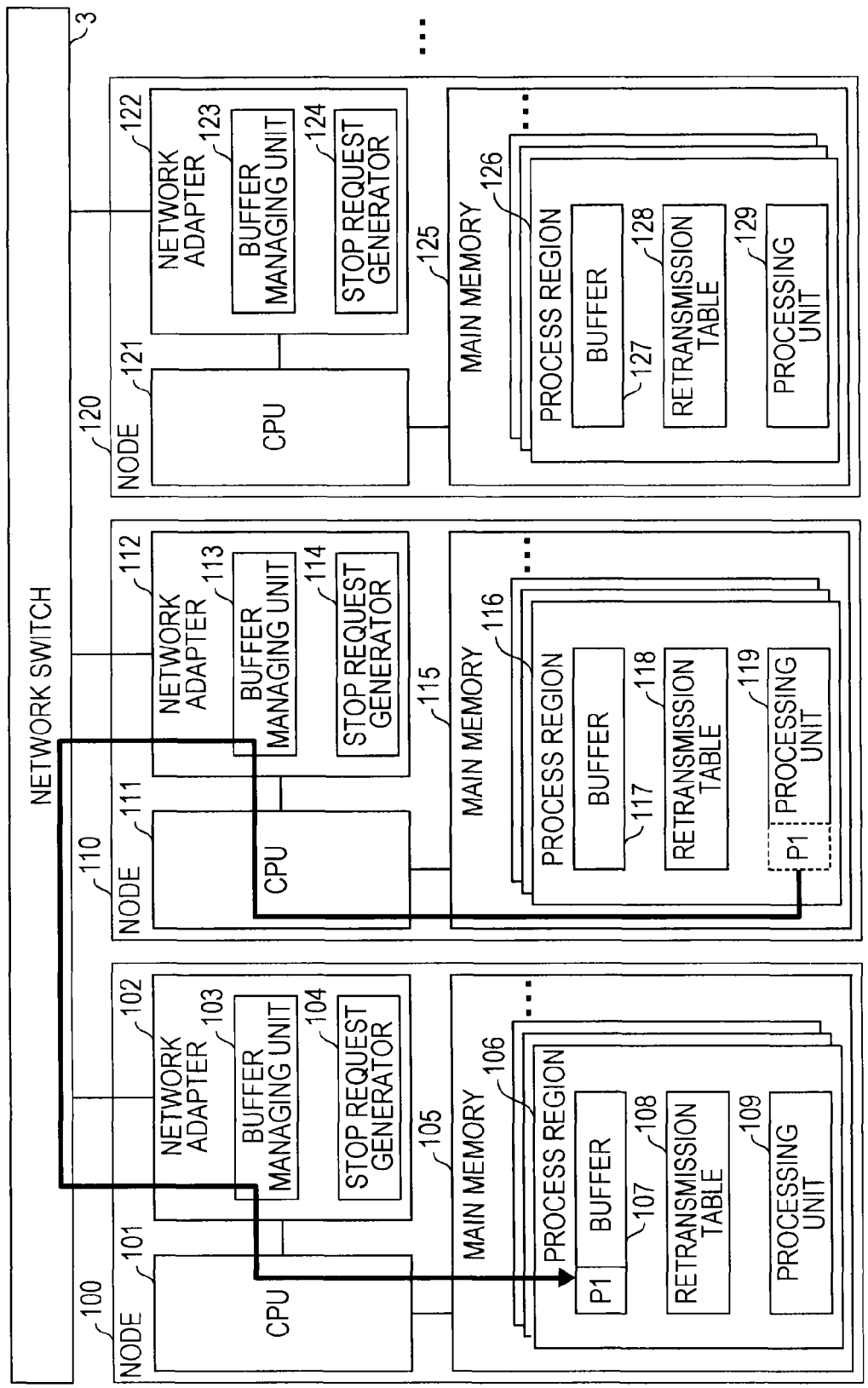
FIG. 13 is a diagram describing the process according to the embodiment in detail.

A process that is executed when the processing unit 119 of the node 110 transmits a packet P1 is described with reference to FIG. 13. The packet P1 within the process region 109 of the node 110 is transmitted by the processing unit 119 through the buffer managing unit 113 to a network. The packet P1 is transferred by the network switch 3 to the node 100. When receiving the packet P1, the buffer managing unit 103 of the node 100 determines whether or not the buffer 107 has an available region. If the buffer 107 has the available region, the buffer managing unit 103 causes the packet P1 to be stored in the buffer 107. The packet P1 stored in the buffer 107 is processed by the processing unit 109.

Figure 14:
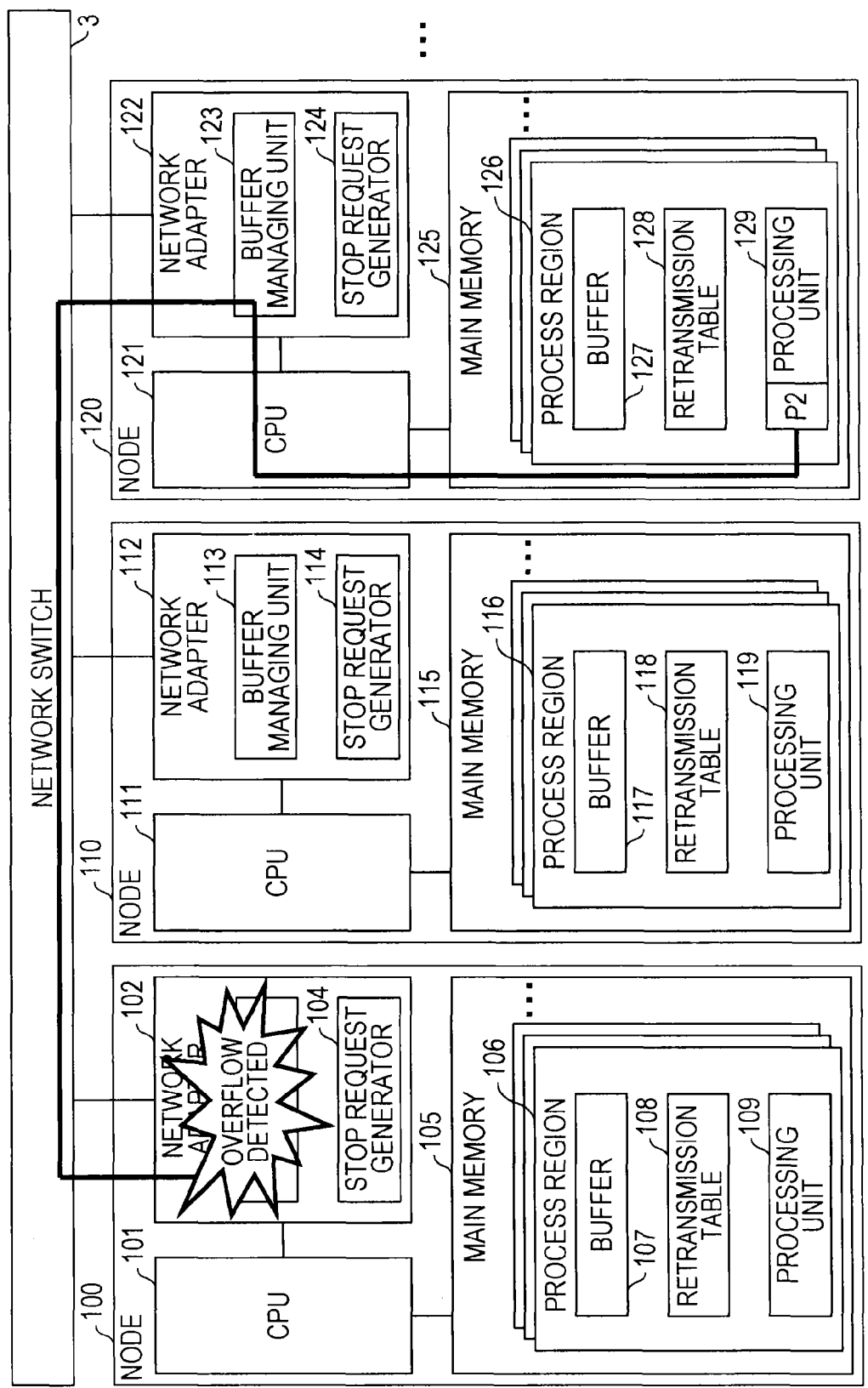
FIG. 14 is a diagram describing the process according to the embodiment in detail.

A process that is executed when the processing unit 129 of the node 120 transmits a packet P2 is described with reference to FIG. 14. The packet P2 within the process region 126 of the node 120 is transmitted by the processing unit 129 through the network adapter 122 to the network. The packet P2 is transferred by the network switch 3 to the node 100. When receiving the packet P2, the buffer managing unit 103 of the node 100 determines whether or not the buffer 107 has an available region. In this case, the buffer managing unit 103 determines that the buffer 107 does not have an available region (or overflow occurs from the buffer 107). Thus, the packet P2 is not stored in the buffer 107 and is discarded by the buffer managing unit 103.

Figure 15:
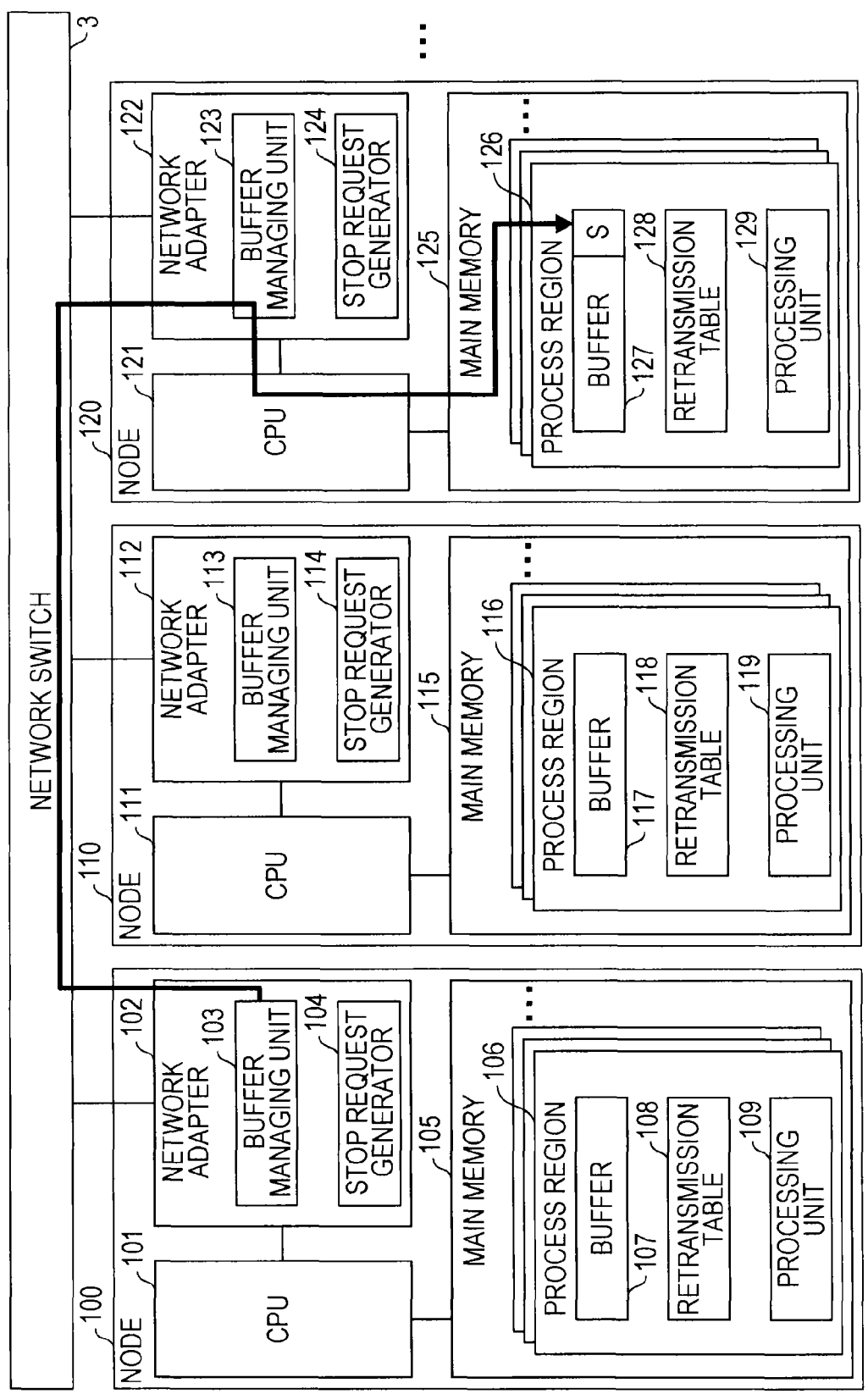
FIG. 15 is a diagram describing the process according to the embodiment in detail.

A process that is executed when the node 100 transmits a stop request to the node 120 is described with reference to FIG. 15. The stop request S that is generated by the stop request generator 104 is transmitted by the buffer managing unit 103 to the network. The stop request S is transferred by the network switch 3 to the node 120. When receiving the stop request S, the buffer managing unit 123 of the node 120 causes the stop request S to be stored in the buffer 127. Since the node 120 receives the stop request S, the processing unit 129 stops transmitting a packet to a transmission process specified by the stop request S.

Figure 16:
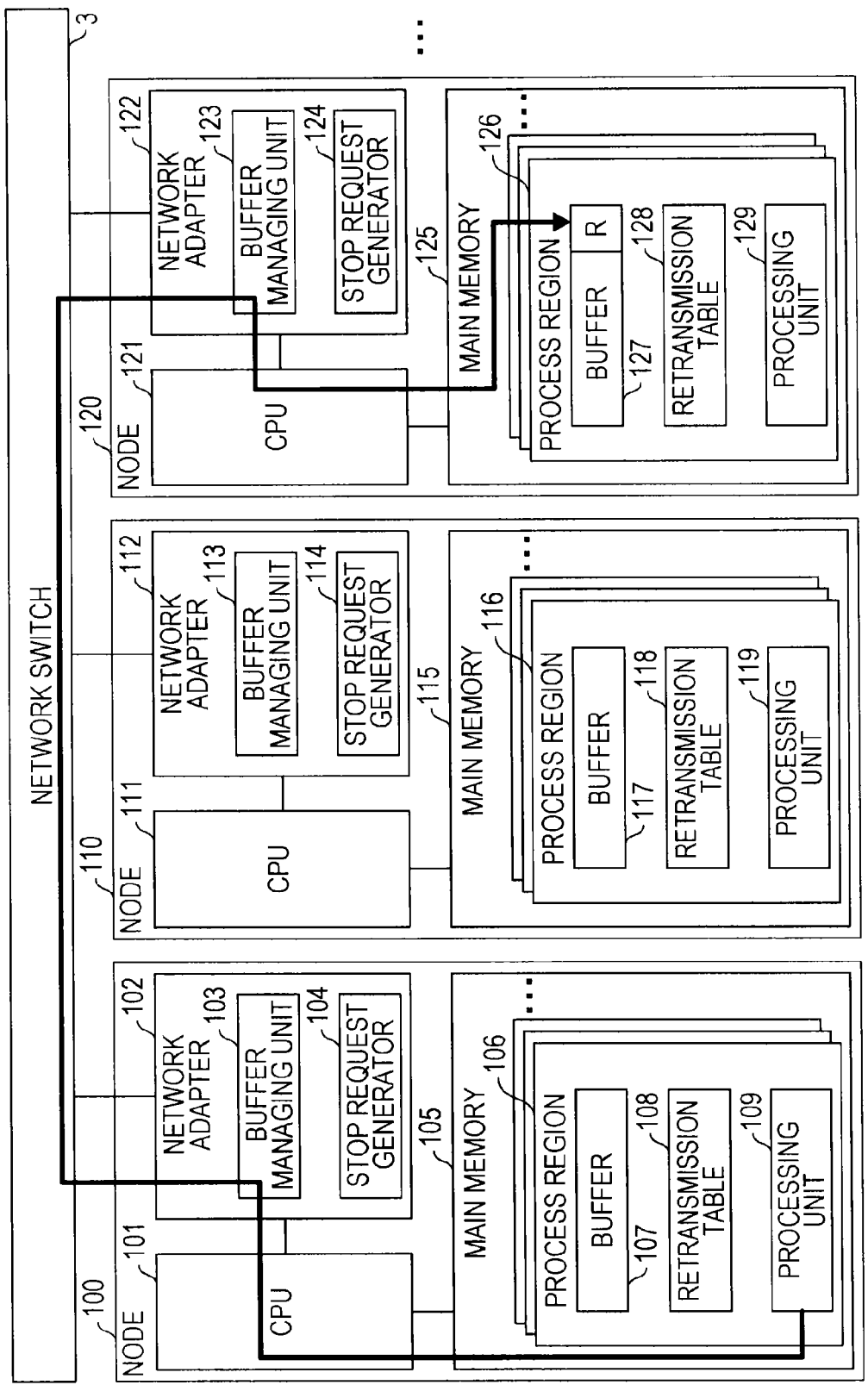
FIG. 16 is a diagram describing the process according to the embodiment in detail.

A process that is executed when the node 100 transmits a retransmit request to the node 120 is described with reference to FIG. 16. The retransmit request R that is generated by the processing unit 109 is transmitted by the buffer managing unit 103 to the network. The retransmit request R is transferred by the network switch 3 to the node 120. When receiving the retransmit request R, the buffer managing unit 123 of the node 120 causes the retransmit request S to be stored in the buffer 127.

Figure 17:
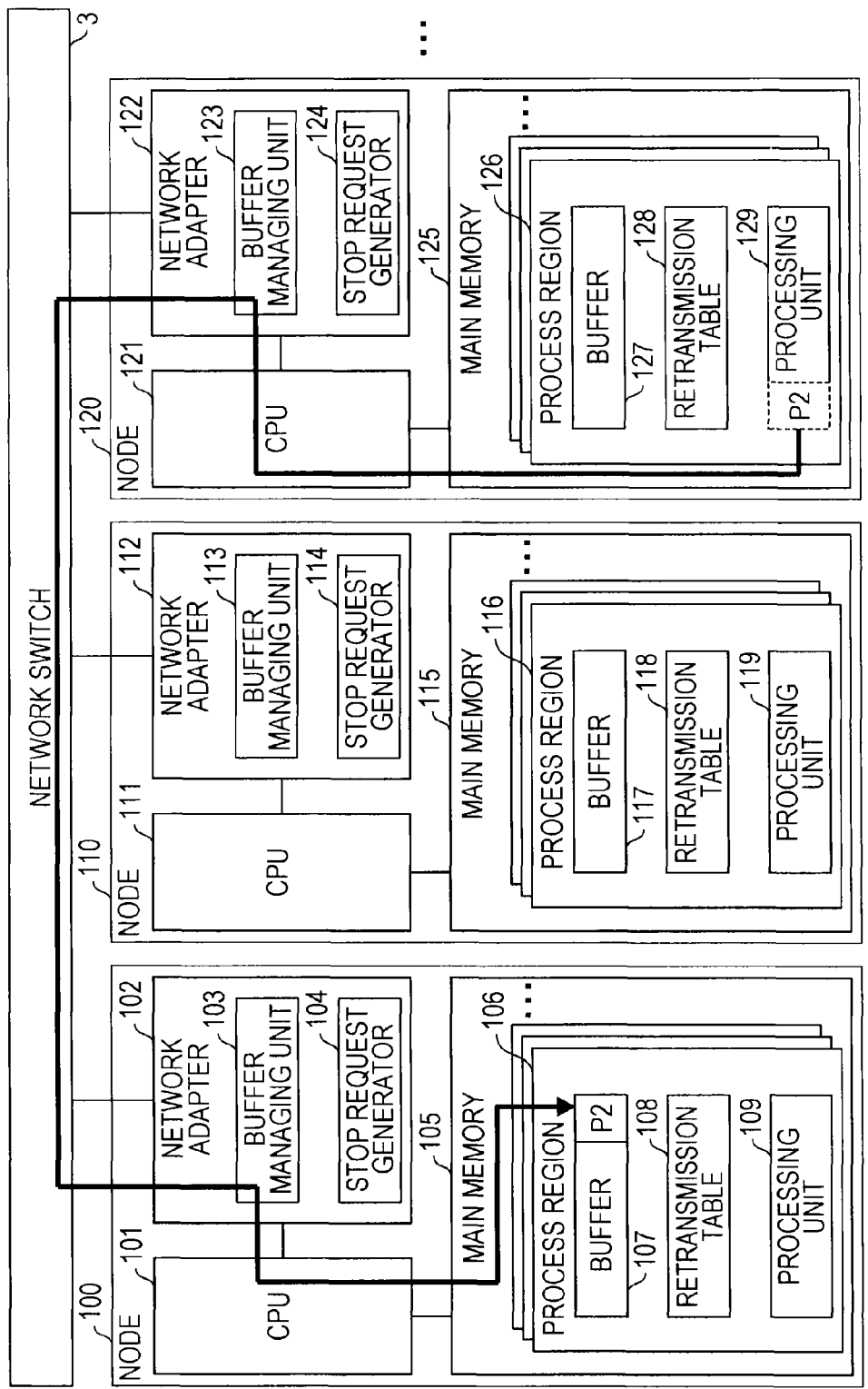
FIG. 17 is a diagram describing the process according to the embodiment in detail.

A process that is executed when the processing unit 129 of the node 120 retransmits the packet P2 is described with reference to FIG. 17. The packet P2 within the process region 126 of the node 120 is retransmitted by the processing unit 129 through the network adapter 122 to the network. The packet P2 is transferred by the network switch 3 to the node 100. When receiving the packet P2, the buffer managing unit 103 of the node 100 determines whether or not the buffer 107 has an available region. In this case, the buffer managing unit 103 determines that the buffer 107 has the available region. Thus, the packet P2 is stored in the buffer 107 and processed by the processing unit 109.

Next, effects of the embodiment are described in detail with reference to FIGS. 18 to 20.

Figure 18:
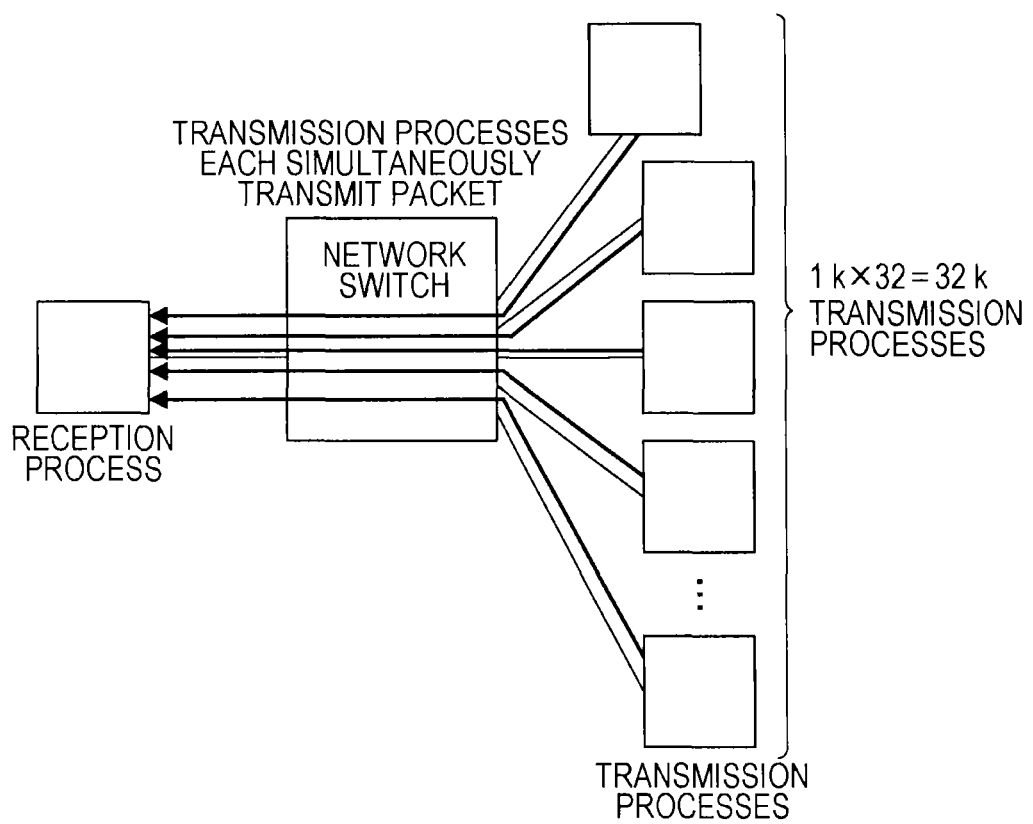
FIG. 18 is a diagram describing the process according to the embodiment in detail.

FIG. 18 illustrates a system to be used for the description of the effects. In the system illustrated in FIG. 18, 1,000 (1 k) transmitting nodes are connected to a single receiving node through a network switch. The transmitting nodes each include 32 transmission processes. Thus, in the system, 32,000 transmission processes each transmit a packet to a reception process. A buffer that is used by the reception process stores up to 4,000 packets.

It is assumed that the 32,000 transmission processes (hereinafter collectively referred to as a transmission process group) each simultaneously transmit a single packet to the reception process that processes the transmitted packets. In addition, it is assumed that packets stored in the buffer are processed (or the buffer becomes empty) before packets that are next transmitted by the transmission process group are stored in the buffer.

If the process according to the embodiment is not executed in the system illustrated in FIG. 18, results illustrated in FIG. 19 are obtained. FIG. 19 chronologically illustrates the numbers of packets transmitted from the transmission process group, the numbers of ACKs transmitted from the reception process to the transmission process group, and the numbers of NAKs transmitted from the reception process to the transmission process group. A time t0 is an initial time, and a time t15 is a time when a process is completed.

As illustrated in FIG. 19, packets are transmitted from the transmission process group to the reception process every two unit times, and the number of packets transmitted from the transmission process group to the reception process are reduced by 4,000 every two unit times. This is due to the fact that 4,000 packets are processed by the reception process every two unit times. The total number of packets transmitted from the transmission process group to the reception process in a time period from the time t0 to the time t15 is 144,000.

4,000 ACKs are transmitted from the reception process to the transmission process group every two unit times. The total number of ACKs transmitted in the time period from the time t0 to the time t15 is 32,000.

The number of NAKs transmitted from the reception process is a number obtained by subtracting 4,000 that is the number of packets processed every two unit times from the number of packets transmitted from the transmission process group immediately before the transmission of the NAKs. The total number of NAKs transmitted in the time period from the time t0 to the time t15 is 112,000.

Thus, the total number of packets transferred in the network is 144,000+32,000+112,000=288,000.

On the other hand, if the process according to the embodiment is executed in the system illustrated in FIG. 18, results illustrated in FIG. 20 are obtained. FIG. 20 chronologically illustrates the numbers of packets transmitted from the transmission process group, the numbers of ACKs transmitted from the reception process to the transmission process group, the numbers of stop requests transmitted from the reception process to the transmission process group, and the numbers of retransmit requests transmitted from the reception process to the transmission process group. The time t0 is the initial time, and the time t15 is the time when the process is completed.

As illustrated in FIG. 20, packets are transmitted from the transmission process group to the reception process every two unit times. The number of packets transmitted from the transmission process group to the reception process at the time t0 is 32,000, while the number of packets transmitted from the transmission process group to the reception process at each of times other than the time t0 is 4,000. The total number of packets transmitted from the transmission process group to the reception process in the time period from the time t0 to the time t15 is 60,000.

4,000 ACKs are transmitted from the reception process to the transmission process group every two unit times. The total number of ACKs transmitted in the time period from the time t0 to the time t15 is 32,000.

28,000 stop requests are transmitted from the reception process to the transmission process at the time t1. A stop request, however, is not transmitted after the time t1. Thus, the total number of the stop requests transmitted in the time period from the time t0 to the time t15 is 28,000.

4,000 retransmit requests are transmitted from the reception process to the transmission process group every two unit times. The total number of retransmit requests transmitted in the time period from the time t0 to the time t15 is 28,000. Thus, the total number of the packets transferred in the network is 60,000+32,000+28,000+28,000=148,000.

If the reception process communicates with processes of which the number is obtained by multiplying the number of packets to be stored in a buffer by m, a reduction rate of the number of packets may be calculated to be a value of $((m^2-4m+3)/(m^2+m)\times100)(\%)$. In the aforementioned example, since m=8, the reduction rate of the number of packets=35/72×100≈49%.

When FIG. 20 is compared with FIG. 19, the numbers of operations executed until the processes are completed are equal to each other. However, since the process according to the embodiment is executed without waiting for the occurrence of a timeout, a time taken for each operation is short in the process according to the process. Thus, a time taken until the process is completed in the example illustrated in FIG. 20 is shorter than a time taken until the process is completed in the example illustrated in FIG. 19.

The embodiment is described above, but is not limited to this. For example, the functional block configurations of the aforementioned nodes 100 to 120 may not match actual program module configurations.

The configurations of the aforementioned tables are an example, and the tables may not have the aforementioned configurations. In the process flows, the order of processes may be changed as long as results of the processes do not change. Two or more of the processes may be executed in parallel.

Figure 21:
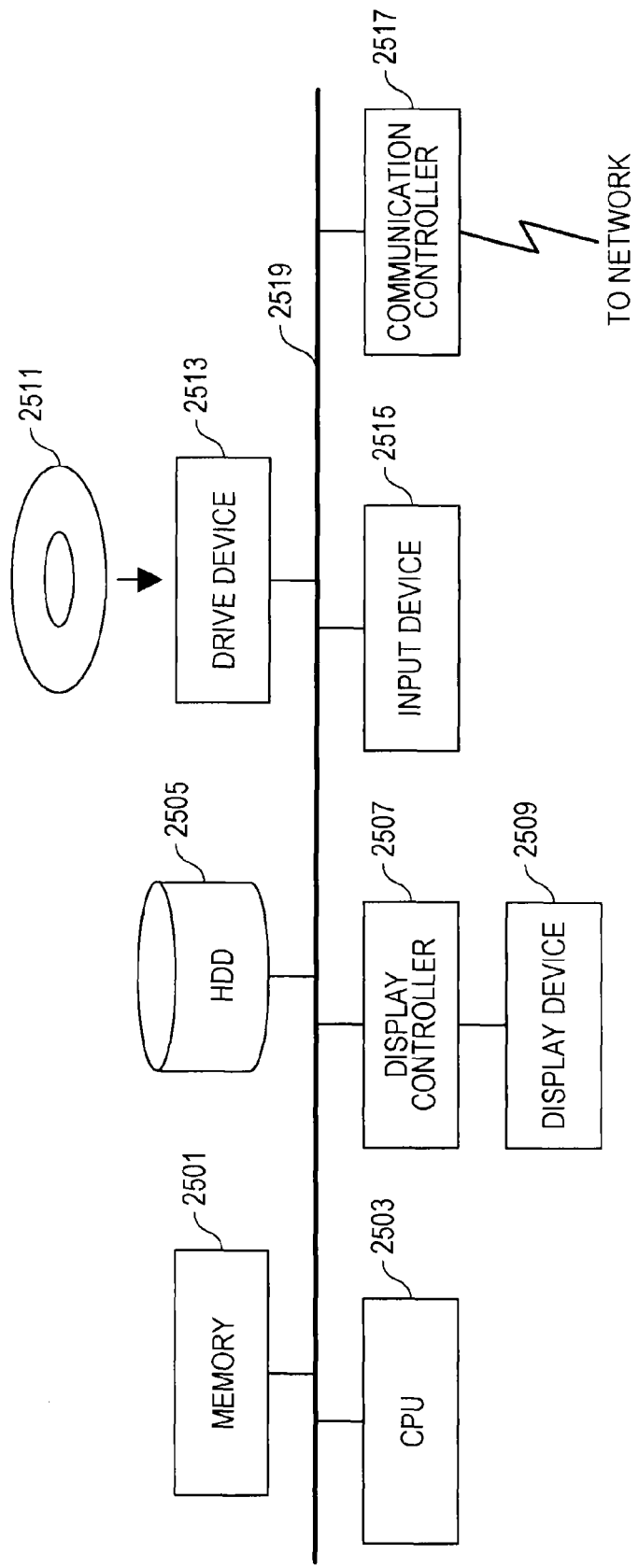
FIG. 21 is a functional block diagram of a computer.

The nodes 100 to 120 are computer devices. As illustrated in FIG. 21, in each of the nodes 100 to 120, a memory 2501, a central processing unit (CPU) 2503, a hard disk drive (HDD) 2505, a display controller 2507 connected to a display device 2509, a drive device 2513 provided for a removable disk 2511, an input device 2515, and a communication controller 2517 configured to connect the node to the network, are connected to each other through a bus 2519. An operating system (OS) and an application program to be used to execute the process according to the embodiment are stored in the HDD 2505. When the OS and the application program are to be executed by the CPU 2503, the OS and the application program are read from the HDD 2505 into the memory 2501. The CPU 2503 controls the display controller 2507, the communication controller 2517, and the drive device 2513 based on details of the process of the application program and causes the display controller 2507, the communication controller 2517, and the drive device 2513 to execute predetermined operations. Data that is being processed is mainly stored in the memory 2501, but may be stored in the HDD 2505. In the embodiment, the application program that is used to execute the aforementioned process is stored in the computer-readable removable disk 2511, distributed, and installed from the drive device 2513 in the HDD 2505. The application program may be installed in the HDD 2505 through a network such as the Internet and the communication controller 2517. Each of the computer devices causes hardware such as the CPU 2503 and the memory 2501 to closely collaborate with programs such as the OS and the application program and thereby achieves the aforementioned functions of the various types.

The aforementioned embodiment is summarized as follows.

An information processing device according to the embodiment processes packets received from a plurality of sources. The information processing device includes: (A) a buffer configured to store the packets received from the plurality of sources; (B) a first processing unit configured to transmit, to a source of a first packet, a request to stop transmission of a packet and configured to discard the first packet if the buffer does not have an available region for storing the first packet received; and (C) a second processing unit configured to transmit, to the source of the first packet, a request to retransmit the first packet if the buffer has the available region.

Thus, the retransmission of the packet in a state in which the buffer (for example, a shared receive buffer) does not have an available region may be suppressed, and the number of wastefully retransmitted packets may be reduced. Specifically, if overflow occurs from the buffer, the packet is efficiently retransmitted. Since the stop request and the retransmit request are transmitted only to the source that has transmitted the packet, the number of wasteful requests may be reduced, compared with the case where the stop request and the retransmit request are transmitted in multicast. In addition, since the retransmit request is transmitted when the buffer has the available region, the packet may be retransmitted immediately, compared with the packet is retransmitted after a timeout occurs.

The information processing device may include (D) a first data storage unit configured to store source information indicating sources of the packets and data associated with the source information and indicating whether or not the stop request has been transmitted. The first processing unit may associate information of the source of the first packet with data indicating that the stop request has been transmitted, and the first processing unit may causes the information of the source of the first packet and the data indicating that the stop request has been transmitted to be stored in the first data storage unit (b1). The second processing unit may read the information of the source of the first packet from the first data storage unit and transmit the retransmit request to the source indicated by the information of the source of the first packet if the buffer has the available region (c1). If the source information is stored, the discarded packet may be reacquired without a loss. In addition, the information processing device may handle the case where a plurality of sources exist.

The source information may include identification information of nodes and identification information of processes. In this case, the information processing device may handle the case where a plurality of processes are executed in a single node and each transmit a packet.

A program that causes a computer to execute a process by the aforementioned method may be developed and is stored in a storage device or a computer-readable recording medium such as a flexible disk, a CD-ROM, a magneto-optical disc, a semiconductor memory, or a hard disk. An intermediate result of the process is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device configured to process packets received from a plurality of sources, comprising:
   a buffer configured to store the packets received from the plurality of sources;
   a data storage configured to store source information including source identification and process identification of the packets and data associated with the source information indicating whether or not a stop request has been transmitted; and
   a processor configured to:
   transmit, to a source of a first packet, a stop request to stop transmission of the first packet and discard the first packet if the buffer does not have an available region for storing the first packet received;
   store, in the data storage, the source identification and the process identification of the first packet as the source information and the data indicating that the stop request has been transmitted;
   read the source information and the data of the packets from the data storage after generating the available region in the buffer by processing all or some of the packets in the buffer;
   check the read data of the packets including the first packet; and
   transmit, to the source specified by the source identification in the read source information, a retransmit request to retransmit a packet specified by the process identification in the read source information if the read source information indicates that the stop request has been transmitted.

2. The information processing device according to claim 1, wherein the data storage has a number N×M of regions for the data, N indicating a number of the plurality of sources and M indicating a maximum number of processes of the plurality of sources.

3. An information processing system comprising:
   a plurality of transmitting devices; and
   a receiving device configured to process packets received from the plurality of transmitting devices,
   wherein the receiving device includes:
   a buffer configured to store the packets received from the plurality of transmitting devices;
   a data storage configured to store source information including source identification and process identification of the packets and data associated with the source information indicating whether or not a stop request has been transmitted; and
   a first processor configured to:
   transmit, to a transmitting device that is among the plurality of transmitting devices and has transmitted a first packet, a stop request to stop transmission of the first packet and discard the first packet if the buffer does not have an available region for storing the first packet received;
   store, in the data storage, the source identification and the process identification of the first packet as the source information and the data indicating that the stop request has been transmitted;
   read the source information and the data of the packets from the data storage after generating the available region in the buffer by processing all or some of the packets in the buffer;
   check the read data of the packets including the first packet; and
   transmit, to the transmitting device specified by the source identification in the read source information, a retransmit request to retransmit the packet specified by the process identification in the read source information if the read source information indicates that the stop request has been transmitted.

4. The information processing system according to claim 3, wherein the plurality of transmitting devices each include a second processor configured to:
   stop transmission of the first packet to the receiving device when receiving the stop request from the receiving device; and
   transmit the first packet to the receiving device when receiving the retransmit request from the receiving device.

5. The information processing system according to claim 3, wherein the data storage has a number N×M of regions for the data, N indicating a number of the plurality of transmitting devices and M indicating a maximum number of processes of the plurality of transmitting devices.

6. A method comprising:
transmitting, to a first transmitting device that is among transmitting devices and has transmitted a first packet, a stop request to stop transmission of the first packet and discarding the first packet if a buffer configured to store packets received from the transmitting devices does not have an available region for storing the first packet received;
storing, in a data storage, source identification and process identification of the first packet as source information and data indicating that the stop request has been transmitted, wherein the data storage stores source information including source identification and process identification of the packets and data associated with the source information indicating whether or not a stop request has been transmitted;
reading the source information and the data of the packets from the data storage after generating the available region in the buffer by processing all or some of the packets in the buffer;
checking the read data of the packets including the first packet; and
transmitting, to the transmitting device specified by the source identification in the read source information, a retransmit request to retransmit the packet specified by the process identification in the read source information if the read data indicates that the stop request has been transmitted.

7. The method according to claim 6, wherein transmission of the first packet from the first transmitting device is stopped when receiving the stop request, and transmission of the first packet from the first transmitting device is restarted when receiving the retransmit request.

8. The method according to claim 6, wherein the data storage has a number N×M of regions for the data, N indicating a number of the transmitting devices and M indicating a maximum number of processes of the transmitting devices.

* * * * *